US012592377B2

(12) United States Patent
Lee et al.

(10) Patent No.: US 12,592,377 B2
(45) Date of Patent: Mar. 31, 2026

(54) METHOD OF PREPARING NEGATIVE ELECTRODE ACTIVE MATERIAL

(71) Applicant: LG ENERGY SOLUTION, LTD., Seoul (KR)

(72) Inventors: Suk Woo Lee, Daejeon (KR); Dong Sik Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1011 days.

(21) Appl. No.: 17/608,223

(22) PCT Filed: Dec. 22, 2020

(86) PCT No.: PCT/KR2020/018920
§ 371 (c)(1),
(2) Date: Nov. 2, 2021

(87) PCT Pub. No.: WO2021/133034
PCT Pub. Date: Jul. 1, 2021

(65) Prior Publication Data
US 2022/0255051 A1     Aug. 11, 2022

(30) Foreign Application Priority Data

Dec. 26, 2019     (KR) ......................... 10-2019-0175725

(51) Int. Cl.
| | |
|---|---|
| *H01M 4/04* | (2006.01) |
| *H01M 4/36* | (2006.01) |
| *H01M 4/38* | (2006.01) |
| *H01M 4/58* | (2010.01) |
| *H01M 4/587* | (2010.01) |
| *H01M 4/02* | (2006.01) |

(52) U.S. Cl.
CPC ........... *H01M 4/049* (2013.01); *H01M 4/366* (2013.01); *H01M 4/386* (2013.01); *H01M 4/5825* (2013.01); *H01M 4/587* (2013.01); *H01M 2004/021* (2013.01); *H01M 2004/027* (2013.01)

(58) Field of Classification Search
CPC ...... H01M 4/049; H01M 4/366; H01M 4/386; H01M 4/5825; H01M 4/587; H01M 2004/021; H01M 2004/027; H01M 4/136; H01M 4/1397; H01M 10/0525; H01M 4/625; H01M 4/483; H01M 4/624; H01M 4/628; H01M 10/052; H01M 4/62; Y02E 60/10; C01B 32/21; C01B 25/45; C01B 33/02; C01P 2004/80; C01P 2006/40
See application file for complete search history.

(56) References Cited

U.S. PATENT DOCUMENTS

| | | |
|---|---|---|
| 2003/0048528 A1 | 3/2003 | Cho et al. |
| 2008/0124630 A1 | 5/2008 | Kim et al. |
| 2008/0131781 A1 | 6/2008 | Yong et al. |
| 2008/0280141 A1 | 11/2008 | Dobbs et al. |
| 2010/0055568 A1 | 3/2010 | Kim et al. |
| 2011/0226990 A1* | 9/2011 | Glennon ............. B01J 20/3295 |
| | | 252/184 |
| 2012/0258362 A1 | 10/2012 | Mah et al. |
| 2012/0295167 A1 | 11/2012 | Holzapfel et al. |
| 2013/0122300 A1 | 5/2013 | Dobbs et al. |
| 2013/0130111 A1* | 5/2013 | Bodoardo ............. H01M 4/136 |
| | | 252/521.2 |
| 2015/0171420 A1 | 6/2015 | Park et al. |
| 2015/0236339 A1 | 8/2015 | Holzapfel et al. |
| 2016/0141598 A1 | 5/2016 | Dai et al. |
| 2017/0092940 A1* | 3/2017 | Kim ...................... H01M 4/366 |
| 2017/0170515 A1* | 6/2017 | Yushin .................. H01M 4/582 |
| 2020/0381713 A1 | 12/2020 | Chung et al. |
| 2021/0184218 A1 | 6/2021 | Ahn et al. |

FOREIGN PATENT DOCUMENTS

| | | | |
|---|---|---|---|
| CN | 104752721 A | | 7/2015 |
| CN | 106206058 A | * | 12/2016 |
| CN | 108305994 A | | 7/2018 |

(Continued)

OTHER PUBLICATIONS

CN-109494367-A, machine translation, originally published 2019, p. 1-11 (Year: 2019).*
CN-106206058-A, machine translation, originally published 2016, p. 1-10 (Year: 2016).*
CN-108987687-A, machine translation, originally published 2018, p. 1-9 (Year: 2018).*
KR 20180062112 A, machine translation, originally published 2018, p. 1-10 (Year: 2018).*
Extended European Search Report for European Application No. 20907234.7, dated Oct. 6, 2022.
International Search Report (PCT/ISA/210) issued in PCT/KR2020/018920, dated Apr. 7, 2021.

(Continued)

*Primary Examiner* — Gordon Baldwin
*Assistant Examiner* — Christina D McClure
(74) *Attorney, Agent, or Firm* — Birch, Stewart, Kolasch & Birch, LLP

(57) ABSTRACT

Disclosed is a method of preparing a negative electrode active material which includes (a) dispersing an active material core in a solution containing a surfactant to coat the surfactant on the active material core, (b) adding and dispersing a first precursor, which is bondable with the surfactant by electrostatic attraction, in the solution, (c) adding and dispersing a second precursor, which is bondable with the first precursor by electrostatic attraction, in the solution, (d) preparing a lithium compound precursor by a hydrothermal reaction of the first precursor and the second precursor in the solution, and (e) performing a heat treatment on the lithium compound precursor to thermally decompose the surfactant, and forming a protective layer containing a lithium compound on the active material core, wherein one of the first precursor and the second precursor is at least one selected from lithium hydroxide, lithium oxide, lithium nitrate or lithium sulfate.

15 Claims, No Drawings

(56) References Cited

FOREIGN PATENT DOCUMENTS

| | | | | | |
|---|---|---|---|---|---|
| CN | 108987687 | A | * | 12/2018 | ........ H01M 10/0525 |
| CN | 109429535 | A | | 3/2019 | |
| CN | 109494367 | A | * | 3/2019 | ........ H01M 10/0525 |
| EP | 2 455 355 | A1 | | 5/2012 | |
| JP | 4971387 | B2 | | 7/2012 | |
| JP | 2015-145335 | A | | 8/2015 | |
| JP | 2019-96419 | A | | 6/2019 | |
| KR | 2003-0021112 | A | | 3/2003 | |
| KR | 10-2006-0050508 | A | | 5/2006 | |
| KR | 10-0814881 | B1 | | 3/2008 | |
| KR | 10-2012-0114896 | A | | 10/2012 | |
| KR | 10-1336566 | B1 | | 12/2013 | |
| KR | 10-2015-0071521 | A | | 6/2015 | |
| KR | 10-2015-0088769 | A | | 6/2015 | |
| KR | 10-2016-0023751 | A | | 3/2016 | |
| KR | 10-2017-0055750 | A | | 5/2017 | |
| KR | 10-2017-0074030 | A | | 6/2017 | |
| KR | 10-2017-0163178 | A | | 9/2017 | |
| KR | 10-2018-0062112 | A | | 6/2018 | |
| KR | 10-2019-0134537 | A | | 12/2019 | |

OTHER PUBLICATIONS

Peng et al., "Thin-Film NASICON-Type Li1+xAlxTi2-x(PO4)3 Solid Electrolyte Directly Fabricated on a Graphite Substrate with a Hydrothermal Method Based on Different Al Sources," ACS Sustainable Chemistry & Engineering, vol. 7, 2019, pp. 10751-10762.

* cited by examiner

METHOD OF PREPARING NEGATIVE ELECTRODE ACTIVE MATERIAL

CROSS-REFERENCE TO RELATED APPLICATIONS

This application claims priority from Korean Patent Application No. 10-2019-0175725, filed on Dec. 26, 2019, the disclosure of which is incorporated by reference herein.

TECHNICAL FIELD

The present invention relates to a method of preparing a negative electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In general, the lithium secondary battery includes a positive electrode, a negative electrode, a separator disposed between the positive electrode and the negative electrode, an electrolyte, and an organic solvent. Also, with respect to the positive electrode and the negative electrode, an active material layer including a positive electrode active material or a negative electrode active material may be formed on a current collector. A lithium-containing metal oxide, such as $LiCoO_2$ and $LiMn_2O_4$, is generally used as the positive electrode active material in the positive electrode, and, accordingly, a carbon-based active material or silicon-based active material containing no lithium is used as the negative electrode active material in the negative electrode.

A passivation film, such as a solid electrolyte interface layer (SEI layer) formed of LiF or $Li_2CO_3$, is formed on a surface of the negative electrode active material during initial charge of the negative electrode. Since the passivation film prevents the organic solvent from being inserted into the negative electrode and inhibits a decomposition reaction of the organic solvent, it improves stabilization of a negative electrode structure and reversibility of the negative electrode, and allows it to be used as a negative electrode.

However, since $Li_2CO_3$, as a component of the solid electrolyte interface layer, has very low ion conductivity, there is a problem in that diffusion of lithium ions is concentrated on LiF or an interface of LiF and $Li_2CO_3$ and this causes overcharge and a resistance increase phenomenon in the corresponding part, and thus, there is a problem in that a lithium precipitation phenomenon occurs. The precipitated lithium may significantly reduce stability of the negative electrode active material, for example, penetration of the passivation film, a rapid exothermic reaction, and degradation of life performance, while growing in the form of dendrites.

Accordingly, there is an urgent need to develop a negative electrode active material in which stability is improved while ionic conductivity of a surface of the negative electrode active material is made uniform.

Korean Patent Application Laid-open Publication No. 10-2017-0074030 discloses a negative electrode active material for a lithium secondary battery and a method of preparing the same, but has limitations in solving the above-described problems.

PRIOR ART DOCUMENT

[Patent Document]
Korea Patent Application Laid-open Publication No. 10-2017-0074030

DISCLOSURE OF THE INVENTION

Technical Problem

An aspect of the present invention provides a method of preparing a negative electrode active material with improved rapid charging performance and life performance.

Technical Solution

According to an aspect of the present invention, there is provided a method of preparing a negative electrode active material which includes the steps of: (a) dispersing an active material core in a solution containing a surfactant to coat the surfactant on the active material core; (b) adding and dispersing a first precursor, which is bondable with the surfactant by electrostatic attraction, in the solution; (c) adding and dispersing a second precursor, which is bondable with the first precursor by electrostatic attraction, in the solution; (d) preparing a lithium compound precursor by a hydrothermal reaction of the first precursor and the second precursor in the solution; and (e) performing a heat treatment on the lithium compound precursor to thermally decompose the surfactant, and forming a protective layer containing a lithium compound on the active material core, wherein one of the first precursor and the second precursor is at least one selected from the group consisting of lithium hydroxide, lithium oxide, lithium nitrate, and lithium sulfate.

Advantageous Effects

According to a method of preparing a negative electrode active material of the present invention, a process of coating an active material core with a surfactant is performed before a lithium compound-containing protective layer is formed on the active material core. Since the surfactant may form a uniform charge on a surface of the active material core, it may be bonded to an ionic or polar lithium compound protective layer precursor by electrostatic attraction. Since the bonding by the electrostatic attraction allows the lithium compound to be uniformly coated on the surface of the active material core, ionic conductivity and life performance of the negative electrode active material may be significantly improved.

Also, according to the method of preparing a negative electrode active material of the present invention, since a specific lithium compound, instead of a solid electrolyte interface layer (SEI layer) containing $Li_2CO_3$ or the like, is formed on the active material core, a phenomenon, in which inflow/outflow of lithium ions are concentrated in a specific region of the active material core, and a phenomenon, in which lithium in the form of dendrites is precipitated, may be prevented, and thus, stability and life performance of the negative electrode may be improved.

Furthermore, according to the method of preparing a negative electrode active material of the present invention, rapid charging performance of the negative electrode may be improved by forming a protective layer containing a lithium compound having high ionic conductivity on the active material core.

MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include", "comprise", or "have" when used in this specification, specify the presence of stated features, numbers, steps, elements, or combinations thereof, but do not preclude the presence or addition of one or more other features, numbers, steps, elements, or combinations thereof.

The expression "average particle diameter ($D_{50}$)" in the present specification may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

Hereinafter, the present invention will be described in detail.

<Method of Preparing Negative Electrode Active Material>

The present invention provides a method of preparing a negative electrode active material, specifically a method of preparing a negative electrode active material for a lithium secondary battery.

Specifically, the method of preparing a negative electrode active material according to the present invention includes the steps of: (a) dispersing an active material core in a solution containing a surfactant to coat the surfactant on the active material core; (b) adding and dispersing a first precursor, which is bondable with the surfactant by electrostatic attraction, in the solution; (c) adding and dispersing a second precursor, which is bondable with the first precursor by electrostatic attraction, in the solution; (d) preparing a lithium compound precursor by a hydrothermal reaction of the first precursor and the second precursor in the solution; and (e) performing a heat treatment on the lithium compound precursor to thermally decompose the surfactant, and forming a protective layer containing a lithium compound on the active material core, wherein one of the first precursor and the second precursor is at least one selected from the group consisting of lithium hydroxide, lithium oxide, lithium nitrate, and lithium sulfate.

LiF or $Li_2CO_3$ is contained in a solid electrolyte interface layer (SEI layer) that is formed during initial charge of the negative electrode active material, wherein since $Li_2CO_3$ among them has very low ion conductivity, there is a problem in that inflow/outflow of lithium ions are concentrated on LiF or an interface of LiF and $Li_2CO_3$. Current concentration in a specific region of the negative electrode active material causes a problem such as overcharge and resistance increase in the corresponding part, and causes a problem in which lithium is precipitated in the form of dendrites. The precipitation of the lithium may significantly reduce stability of a negative electrode, for example, penetration of the solid electrolyte interface layer, explosion of the negative electrode, and degradation of life performance.

According to the method of preparing a negative electrode active material of the present invention, a surfactant is dispersed on a surface of an active material core so that the surface of the active material core has a positive (+) charge or a negative (−) charge, and a first precursor, which is an ionic material or a polar material having a charge opposite thereto, is added and dispersed so that the first precursor and the surfactant are bonded by electrostatic attraction and the first precursor is uniformly disposed on the active material core. Since the first precursor may be uniformly disposed on the active material core, a protective layer containing a lithium compound may be uniformly formed on the active material core by adding a second precursor, a hydrothermal reaction step, and a heat treatment step which will be described later. Since the protective layer may improve ionic conductivity and rapid charging performance of the negative electrode active material and may prevent a material having low ionic conductivity, such as $Li_2CO_3$, from being formed on the active material core, the lithium precipitation and the resulting problems of degradation of stability and life performance of the negative electrode may be addressed.

Also, the negative electrode active material prepared by the method of preparing a negative electrode active material of the present invention is characterized in that a protective layer containing a specific lithium compound having high ionic conductivity is formed on the active material core. Since the protective layer containing a specific lithium compound is formed in advance instead of the solid electrolyte interface layer (SEI layer) formed during the initial charge of the negative electrode active material, the ionic conductivity of the negative electrode active material is improved and a phenomenon, in which lithium is concentrated in a specific region, may be prevented. Furthermore, since the precipitation of the lithium may be prevented by forming the protective layer on the active material core, the stability of the negative electrode, particularly, the life performance of the negative electrode may be significantly improved.

The method of preparing a negative electrode active material according to the present invention includes the step of (a) dispersing an active material core in a solution containing a surfactant to coat the surfactant on the active material core.

The active material core may be at least one selected from the group consisting of a carbon-based material and a silicon-based material. Specifically, the active material core may be a carbon-based material in terms of exhibiting excellent cycle characteristics and battery life performance.

The silicon-based material may include a compound represented by $SiO_x(0 \leq x < 2)$. Since $SiO_2$ does not react with lithium ions, it may not store lithium, and thus, x may be within the above range and more preferably, the silicon-based material may be SiO.

The carbon-based active material may include at least one selected from the group consisting of artificial graphite, natural graphite, hard carbon, soft carbon, carbon black, acetylene black, Ketjen black, Super P, graphene, and fibrous carbon, and may preferably include at least one selected from the group consisting of artificial graphite and natural graphite.

An average particle diameter ($D_{50}$) of the active material core may be in a range of 1 μm to 30 μm, for example, 5 μm to 20 μm in terms of ensuring structural stability during charge and discharge and reducing a side reaction with an electrolyte solution.

The surfactant may be uniformly coated on the active material core by dispersing the active material core in a solution containing the surfactant, and the surface of the active material core is allowed to have a positive (+) charge or a negative charge (−) so that it may contribute to the uniform and smooth formation of the protective layer.

The surfactant may be a cationic surfactant or an anionic surfactant.

The cationic surfactant may include at least one selected from the group consisting of cetyltrimethylammonium bromide (CTAB), triethylemine hydrochloride, benzothonium chloride, and cetylpyridinium chloride, and may preferably include cetyltrimethylammonium bromide in terms of excellent solubility in water and being more environmentally friendly by containing Br⁻ as an anion.

The anionic surfactant may include at least one selected from the group consisting of ammonium lauryl sulfate, sodium lauryl sulfate, sodium laureth sulfate, α-olefin sulfonate, and sodium stearate, and may preferably include sodium lauryl sulfate in terms of excellent solubility in water and low price.

The surfactant may be coated on the active material core such that a portion having a positive (+) charge or a negative (−) charge faces the outside of the active material core. Specifically, a portion having hydrophobicity in the surfactant is in contact with the surface of the active material core, and the portion having a positive (+) charge or a negative (−) charge (for example, ammonium ion of the CTAB) may be disposed to face the outside of the active material core.

The dispersion of the active material core may be performed by adding the active material core to the solution and performing an ultrasonic treatment.

The method of preparing a negative electrode active material according to the present invention includes the step of (b) adding and dispersing a first precursor, which is bondable with the surfactant by electrostatic attraction, in the solution, and the step of (c) adding and dispersing a second precursor, which is bondable with the first precursor by electrostatic attraction, in the solution. In this case, one of the first precursor and the second precursor includes at least one selected from the group consisting of lithium hydroxide, lithium oxide, lithium nitrate, and lithium sulfate.

The first precursor and the second precursor may be a material having ionicity or strong polarity, wherein, since the first precursor may be bonded to the above-described surfactant by electrostatic attraction and the second precursor may be bonded to the first precursor by electrostatic attraction, the surface of the active material core may be evenly coated. Since one of the first precursor and the second precursor is a material containing lithium, the first precursor and the second precursor may form a lithium compound-containing protective layer uniformly coated on the surface of the active material core through the hydrothermal reaction step and the heat treatment step, and, accordingly, lithium precipitation and the resulting problems of degradation of the stability and life performance of the negative electrode may be addressed by not only preventing the lithium precipitation due to local intercalation/deintercalation of lithium, but also preventing the formation of the material having low ionic conductivity, such as $Li_2CO_3$, on the active material core.

In a case in which the surfactant is the cationic surfactant, the first precursor may be at least one selected from the group consisting of hydrogen sulfide ($H_2S$), nitric acid ($HNO_3$), hydrofluoric acid (HF), silicic acid ($H_4SiO_4$), sulfuric acid ($H_2SO_4$), and phosphoric acid ($H_3PO_4$), and the second precursor may be at least one selected from the group consisting of lithium hydroxide, lithium oxide, lithium nitrate, and lithium sulfate.

In the case that the surfactant is the cationic surfactant, a compound having an anion is first added as the first precursor to the solution so that the cationic surfactant and the first precursor may be bonded by electrostatic attraction. The first precursor may be uniformly disposed on the surface of the active material core by the electrostatic attraction with the cationic surfactant. Since the first precursor reacts with the second precursor, selectively the second precursor and a third precursor to form a lithium compound, the protective layer containing a lithium compound may be uniformly formed on the active material core.

Specifically, in the case that the surfactant is the cationic surfactant, the first precursor may provide at least one anion selected from sulfide ions ($S^{2-}$), nitrate ions ($NO_3^-$), fluoride ions ($F^-$), silicate ions ($SiO_4^{4-}$), sulfate ions ($SO_4^{2-}$), and phosphate ions ($PO_4^{3-}$) into the solution, and the anion may form a bond with the cationic surfactant by electrostatic attraction.

In the case that the surfactant is the cationic surfactant, the first precursor may be at least one selected from the group consisting of hydrogen sulfide ($H_2S$), nitric acid ($HNO_3$), hydrofluoric acid (HF), silicic acid ($H_4SiO_4$), sulfuric acid ($H_2SO_4$), and phosphoric acid ($H_3PO_4$), and may be preferably phosphoric acid ($H_3PO_4$).

In the case that the surfactant is the cationic surfactant, the second precursor may be at least one selected from the group consisting of lithium hydroxide (LiOH or $LiOH.H_2O$), lithium oxide ($Li_2O$), lithium nitrate ($LiNO_3$), and lithium sulfate ($Li_2SO_4$), and may be preferably lithium hydroxide. The second precursor may provide lithium ions to the solution, and the lithium ions may be bonded to the anions derived from the first precursor by electrostatic attraction. Since the ions derived from the first precursor and the second precursor may be uniformly coated on the active material core by the electrostatic attraction, the lithium compound-containing protective layer may be uniformly coated on the active material core by the hydrothermal reaction and heat treatment to be described later, and thus, rapid charging performance and life characteristics may be improved at the same time.

The second precursor may be at least one selected from the group consisting of $LiOH.H_2O$, $Li_2O$, $LiNO_3$, and $Li_2SO_4$, and may be preferably $LiOH.H_2O$.

In the case that the surfactant is the cationic surfactant, in step (C), a third precursor, which includes at least one metal selected from the group consisting of lanthanum (La), zirconium (Zr), titanium (Ti), aluminum (Al), and germanium (Ge), more preferably at least one metal selected from titanium and aluminum, and most preferably titanium and aluminum, may be added and dispersed.

The metal in the third precursor, for example, may exist in the form of a metal ion or in a form having a partial positive (+) charge in the solution, and the metal ion may be distributed around the anion derived from the above-described first precursor by electrostatic attraction. Accordingly, the metal in the third precursor may be included in the lithium compound to become a protective layer component by the hydrothermal reaction step and heat treatment step to be described later.

The third precursor may be at least one selected from the group consisting of a nitric oxide, an alkoxide, a sulfide, and an oxide of the metal.

In a case in which the surfactant is the anionic surfactant, the first precursor may be at least one selected from the group consisting of lithium hydroxide, lithium oxide, lithium nitrate, and lithium sulfate, and the second precursor may be a compound including at least one selected from the group consisting of hydrogen sulfide ($H_2S$), nitric acid ($HNO_3$), hydrofluoric acid (HF), silicic acid ($H_4SiO_4$), sulfuric acid ($H_2SO_4$), and phosphoric acid ($H_3PO_4$).

In the case that the surfactant is the anionic surfactant, a compound capable of providing lithium ions is first added as the first precursor to the solution so that the anionic surfactant and the lithium ions derived from the first precursor may be bonded by electrostatic attraction. The first precursor may be uniformly disposed on the surface of the active material core by the electrostatic attraction with the anionic surfactant. Since the first precursor reacts with the second precursor, selectively the second precursor and the third precursor to form a lithium compound, the protective layer containing a lithium compound may be uniformly formed on the active material core. Since the ions derived from the first precursor and the second precursor may be uniformly disposed on the active material core by the electrostatic attraction and the lithium compound-containing protective layer may be uniformly coated on the active material core by the hydrothermal reaction and heat treatment to be described later, the rapid charging performance and life characteristics may be improved at the same time by preventing a problem of the lithium precipitation due to a localized lithium displacement phenomenon and preventing the formation of an SEI layer component, such as $Li_2CO_3$ having low ionic conductivity, on the active material core.

Specifically, in the case that the surfactant is the anionic surfactant, the first precursor may be at least one selected from the group consisting of lithium hydroxide (LiOH or $LiOH \cdot H_2O$), lithium oxide ($Li_2O$), lithium nitrate ($LiNO_3$), and lithium sulfate ($Li_2SO_4$), and may be preferably lithium hydroxide. The above materials may provide lithium ions to the solution, and the lithium ions and the anionic surfactant may be bonded by electrostatic attraction.

In the case that the surfactant is the anionic surfactant, the second precursor may be at least one selected from the group consisting of hydrogen sulfide ($H_2S$), nitric acid ($HNO_3$), hydrofluoric acid (HF), silicic acid ($H_4SiO_4$), sulfuric acid ($H_2SO_4$), and phosphoric acid ($H_3PO_4$), and may be preferably phosphoric acid ($H_3PO_4$). The second precursor may provide at least one anion selected from sulfide ions ($S^{2-}$), nitrate ions ($NO_3^-$), fluoride ions ($F^-$), silicate ions ($SiO_4^{4-}$), sulfate ions ($SO_4^{2-}$), and phosphate ions ($PO_4^{3-}$) to the solution, and the anion may form a bond with the above-described lithium ion by electrostatic attraction.

In the case that the surfactant is the anionic surfactant, in step (b), a third precursor, which includes at least one metal selected from the group consisting of lanthanum (La), zirconium (Zr), titanium (Ti), aluminum (Al), and germanium (Ge), more preferably at least one metal selected from titanium and aluminum, and most preferably titanium and aluminum, may be added and dispersed in the solution together with the first precursor.

The metal in the third precursor, for example, may exist in the form of a metal ion or in a form having a partial positive (+) charge in the solution, and the metal ion may form a bond with the above-described anionic surfactant by electrostatic attraction and may be distributed on the active material core. Accordingly, the metal in the third precursor may be included in the lithium compound to become a protective layer component by the hydrothermal reaction step and heat treatment step to be described later.

The third precursor may be at least one selected from the group consisting of a nitric oxide, an alkoxide, a sulfide, and an oxide of the metal.

The method of preparing a negative electrode active material according to the present invention includes the step of (d) preparing a lithium compound precursor by a hydrothermal reaction of the first precursor and the second precursor in the solution.

The first precursor and the second precursor, or the first precursor, the second precursor, and the third precursor may form a lithium compound precursor by the hydrothermal reaction. The lithium compound precursor may form a lithium compound according to the heat treatment to be described later.

The hydrothermal reaction may be performed in a temperature range of 100° C. to 300° C., for example, 150° C. to 250° C., and, since the lithium compound precursor may be smoothly and sufficiently formed when the temperature is within the above range, the lithium compound protective layer may be uniformly formed on the active material core by the heat treatment to be described later.

The first heat treatment may be performed for 3 hours to 20 hours, for example, 5 hours to 15 hours, and it is desirable in terms of the fact that the lithium compound precursor may be sufficiently formed when the heat treatment time is within the above range.

The method of preparing a negative electrode active material according to the present invention may further include a step of removing the active material core, on which the lithium compound precursor is mediated by the surfactant, from the solution, and washing and drying the active material core (step (d')) after performing step (d).

The method of preparing a negative electrode active material according to the present invention includes the step of (e) performing a heat treatment on the lithium compound precursor to thermally decompose the surfactant, and forming a protective layer containing a lithium compound on the active material core.

The surfactant, which has been present between the lithium compound precursor and the active material core, may be thermally decomposed and removed by the heat treatment. Also, the lithium compound precursor may form a lithium compound by the heat treatment to form a protective layer on the active material core. As described above, since the lithium compound precursor is uniformly disposed on the surface of the active material core by the surfactant, a protective layer containing a uniform lithium compound may be formed on the active material core by the heat treatment, and thus, a negative electrode active material with improved ionic conductivity and life characteristics may be prepared.

The heat treatment may be performed in a temperature range of 600° C. to 1,000° C., for example, 700° C. to 850° C., and it is desirable in terms of the fact that the residual surfactant may be thermally decomposed smoothly and the lithium compound protective layer may be smoothly formed from the lithium compound precursor when the temperature is within the above range.

The heat treatment may be performed for 1 hour to 12 hours, for example, 2 hours to 6 hours, and it is desirable in terms of the fact that the residual surfactant may be smoothly removed and the lithium compound protective layer may be smoothly formed from the lithium compound precursor when the heat treatment time is within the above range.

The heat treatment may be performed in an inert atmosphere, and, in this case, it is desirable that the residual surfactant may be oxidized to prevent a problem of remaining on the active material core.

A protective layer containing a lithium compound may be formed on the active material core according to the heat treatment. Since the protective layer may be uniformly formed on the active material core by the above-described surfactant treatment, problems, such as lithium precipitation due to local lithium ion displacement and dendrite formation, may be prevented, and thus, the life performance may be improved and it is desirable to improve the ionic conductivity and the rapid charging performance.

The lithium compound is a compound containing lithium, wherein it may be at least one lithium compound selected from the group consisting of a lithium sulfide, a lithium fluoride, a lithium silicate, a lithium nitrate, and a lithium phosphate. Since the lithium compound may exhibit higher ionic conductivity than the solid electrolyte interface layer component such as $Li_2CO_3$, charging performance of the negative electrode active material may be improved. Also, since the protective layer may be formed in place of the solid electrolyte interface layer, a phenomenon, in which lithium ions are concentrated and intercalated into a specific region of the active material core as $Li_2CO_3$ is formed as the solid electrolyte interface layer component on the active material core, is prevented and the resulting lithium precipitation and problem of degradation of the life performance of the negative electrode may be prevented.

The lithium compound may be at least one selected from the group consisting of lithium-lanthanum-titanium oxide, lithium-lanthanum-zirconium oxide, lithium-aluminum-titanium phosphate, lithium-aluminum-germanium phosphate, lithium-phosphorous nitride, lithium fluoride, and lithium-phosphorus sulfide, and, in this case, excellent ionic conductivity may be exhibited, and, since uniformity of the coating layer may be improved unlike the solid electrolyte interface layer in which various components coexist, smooth intercalation and deintercalation of lithium ions are possible.

Specifically, the lithium compound may be a compound represented by Formula 1 below.

$$Li_{1+x}Al_xM_{2-x}(PO_4)_3 \qquad \text{[Formula 1]}$$

In Formula 1, M is Ti or Ge, and $0 < x < 1$.

In a case in which the lithium compound is the compound of Formula 1, the above-described ionic conductivity improvement effect and life performance improvement effect may be preferably achieved. Specifically, M in Formula 1 may be Ti, and, in this case, it is desirable in terms of exhibiting excellent ionic conductivity, and it is desirable for the improvement of the life performance because a phenomenon, in which lithium ions are concentrated in a specific region to be intercalated and deintercalated, may be prevented.

The protective layer may be included in an amount of 0.5 wt % to 5 wt %, preferably 0.7 wt % to 2.7 wt %, and more preferably 1.5 wt % to 2.5 wt % based on a total weight of the active material core and the protective layer. When the amount of the protective layer is within the above range, a concern for an increase in resistance due to excessive formation of the coating layer and for degradation of the life performance of the negative electrode active material may be prevented while the above-described ionic conductivity and life performance improvement effects are preferably achieved.

The protective layer may be formed of the lithium compound. With respect to the negative electrode active material according to the present invention, the lithium compound may be formed on the surface of the active material core by uniformly forming a positive (+) charge or negative (−) charge on the surface of the active material core with the surfactant and bonding the positive (+) charge or negative (−) charge by the surfactant and ionic materials derived from the precursors (the first precursor and/or the second precursor) of the lithium compound by electrostatic attraction. Accordingly, the lithium compound may be uniformly formed on the surface of the active material core without the need to use the lithium compound in combination with other materials having adhesiveness. From this, an effect of improving the charging performance and life performance by high ionic conductivity of the lithium compound may be preferably achieved, and the degradation of the life performance and an unnecessary increase in resistance due to inclusion of other components in the protective layer may be prevented.

<Negative Electrode>

Also, the present invention provides a negative electrode which includes a negative electrode active material prepared by the above-described method of preparing a negative electrode active material.

Specifically, the negative electrode includes a negative electrode collector; and a negative electrode active material layer formed on the negative electrode collector, wherein the negative electrode active material layer includes the negative electrode active material prepared by the above-described method of preparing a negative electrode active material.

The negative electrode collector is not particularly limited as long as it has high conductivity without causing adverse chemical changes in the battery. Specifically, copper, stainless steel, aluminum, nickel, titanium, fired carbon, copper or stainless steel that is surface-treated with one of carbon, nickel, titanium, silver, or the like, and an aluminum-cadmium alloy may be used as the negative electrode collector.

The negative electrode collector may typically have a thickness of 3 μm to 100 μm.

Microscopic irregularities may be formed on a surface of the negative electrode collector to improve adhesion of the negative electrode active material. For example, the negative electrode collector may be used in various shapes such as that of a film, a sheet, a foil, a net, a porous body, a foam body, a non-woven fabric body, and the like.

The negative electrode active material layer is formed on the negative electrode collector, and includes the above-described negative electrode active material.

The negative electrode active material may be included in an amount of 80 wt % to 99 wt %, for example, 85 wt % to 96 wt % in the negative electrode active material layer.

The negative electrode active material layer may include a binder.

The binder may include at least one selected from the group consisting of a styrene butadiene rubber (SBR), an acrylonitrile butadiene rubber, an acrylic rubber, a butyl rubber, a fluoro rubber, carboxymethyl cellulose (CMC), starch, hydroxypropyl cellulose, regenerated cellulose, polyvinyl alcohol (PVA), polyacrylic acid (PAA), polyethylene glycol (PEG), polyacrylonitrile (PAN), and polyacryl amide (PAM), in terms of further improving electrode adhesion and providing sufficient resistance to volume expansion/contraction of the active material. Preferably, the binder may include a styrene-butadiene rubber and carboxymethyl cellulose.

The binder may be included in an amount of 0.5 wt % to 10 wt % in the negative electrode active material layer, and, when the amount of the binder is within the above range, it is desirable in terms of the fact that the volume expansion of the active material may be more effectively controlled.

The negative electrode active material layer may further include a conductive agent. The conductive agent may be used to improve conductivity of the negative electrode, and one having conductivity while not causing adverse chemical changes is good. Specifically, the conductive agent may be at least one selected from the group consisting of natural graphite, artificial graphite, carbon black, acetylene black, Ketjen black, channel black, furnace black, lamp black, thermal black, conductive fibers, fluorocarbon, aluminum powder, nickel powder, zinc oxide, potassium titanate, titanium oxide, and polyphenylene derivatives, and may preferably include carbon black in terms of achieving high conductivity.

The conductive agent may be included in an amount of 0.5 wt % to 10 wt % in the negative electrode active material layer.

A thickness of the negative electrode active material layer may be in a range of 30 μm to 100 μm, for example, 40 μm to 80 μm in terms of increasing an electrical contact with components of a negative electrode material.

A negative electrode slurry is prepared by dispersing the negative electrode material, the binder, and the conductive agent in a solvent for forming a negative electrode slurry, and the negative electrode may be prepared by coating the negative electrode collector with the negative electrode slurry, drying, and then rolling the coated negative electrode collector.

The solvent for forming a negative electrode slurry may include at least one selected from the group consisting of distilled water, ethanol, methanol, and isopropyl alcohol, and may preferably include distilled water, in terms of facilitating the dispersion of the components.

<Secondary Battery>

The present invention provides a secondary battery including the above-described negative electrode, specifically a lithium secondary battery.

Specifically, the secondary battery according to the present invention includes the above-described negative electrode; a positive electrode facing the negative electrode; a separator disposed between the negative electrode and the positive electrode; and an electrolyte.

The positive electrode may include a positive electrode collector; and a positive electrode active material layer formed on the positive electrode collector.

The positive electrode collector is not particularly limited as long as it has high conductivity without causing adverse chemical changes in the battery. Specifically, copper, stainless steel, aluminum, nickel, titanium, fired carbon, copper or stainless steel that is surface-treated with one of carbon, nickel, titanium, or silver, or an aluminum-cadmium alloy may be used as the positive electrode collector.

The positive electrode collector may typically have a thickness of 3 μm to 500 μm.

The positive electrode collector may have a surface with fine roughness to improve adhesion to a positive electrode active material. For example, the positive electrode collector may be used in various shapes such as a film, a sheet, a foil, a net, a porous body, a foam body, a non-woven fabric body, and the like.

The positive electrode active material layer may include a positive electrode active material.

Specifically, the positive electrode active material is a compound capable of reversibly intercalating and deintercalating lithium, wherein the positive electrode active material may include a lithium transition metal composite oxide including lithium and at least one transition metal composed of nickel, cobalt, manganese, and aluminum, for example, a lithium transition metal composite oxide including lithium and transition metal containing nickel, cobalt, and manganese.

More specifically, the lithium transition metal composite oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_YO_2$ (where $0<Y<1$), $LiMn_{2-Z}Ni_ZO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), or lithium-nickel-cobalt-transition metal (M) oxide (e.g., $Li(Ni_{p2}Co_{q2}M_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), and any one thereof or a compound of two or more thereof may be included. Among these materials, in terms of the improvement of capacity characteristics and stability of the battery, the lithium transition metal composite oxide may include $LiCoO_2$, $LiMnO_2$, $LiNiO_2$, lithium nickel-manganese-cobalt oxide (e.g., $Li(Ni_{0.6}Mn_{0.2}CO_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium transition metal composite oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$ and any one thereof or a mixture of two or more thereof may be used.

The positive electrode active material may be included in an amount of 80 wt % to 99 wt %, for example, 92 wt % to 98.5 wt % in the positive electrode active material layer in consideration of exhibition of sufficient capacity of the positive electrode active material.

The positive electrode active material layer may further include a binder and/or a conductive agent as well as the above-described positive electrode active material.

The binder is a component that assists in the binding between the active material and the conductive agent and in the binding with the current collector, wherein, specifically, the binder may include at least one selected from the group consisting of polyvinylidene fluoride, polyvinyl alcohol, carboxymethyl cellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber, and a fluoro rubber, and may preferably include polyvinylidene fluoride.

The binder may be included in an amount of 1 wt % to 20 wt %, for example, 1.2 wt % to 10 wt % in the positive electrode active material layer in terms of sufficiently securing the binding between the components such as the positive electrode active material.

The conductive agent may be used to assist and improve conductivity in the secondary battery, and is not particularly limited as long as it has conductivity without causing adverse chemical changes. Specifically, the conductive agent may include at least one selected from the group consisting of graphite such as natural graphite and artificial graphite; carbon black such as acetylene black, Ketjen black, channel black, furnace black, lamp black, and thermal black; conductive fibers such as carbon fibers or metal fibers; conductive tubers such as carbon nanotubes; fluorocarbon; metal powders such as aluminum powder and nickel powder; conductive whiskers such as zinc oxide whiskers and potassium titanate whiskers; conductive metal oxide such as titanium oxide; and polyphenylene derivatives, and may preferably include carbon black in terms of improving the conductivity.

The conductive agent may be included in an amount of 1 wt % to 20 wt %, for example, 1.2 wt % to 10 wt % in the positive electrode active material layer in terms of sufficiently securing the electrical conductivity.

A thickness of the positive electrode active material layer may be in a range of 30 $\mu$m to 400 $\mu$m, for example, 50 $\mu$m to 110 $\mu$m.

After a positive electrode slurry containing the positive electrode active material as well as selectively the binder, the conductive agent, and a solvent for forming a positive electrode slurry is coated on the positive electrode collector, the positive electrode may be prepared by drying and rolling the coated positive electrode collector.

The solvent for forming a positive electrode slurry may include an organic solvent, such as N-methyl-2-pyrrolidone (NMP), and may be used in an amount such that desirable viscosity is obtained when the positive electrode active material as well as selectively the binder and the conductive agent are included. For example, the solvent for forming a positive electrode slurry may be included in the positive electrode slurry in an amount such that a concentration of a solid content including the positive electrode active material as well as selectively the binder and the conductive agent is in a range of 50 wt % to 95 wt %, for example, 70 wt % to 90 wt %.

The separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, $\gamma$-butyrolactone, and $\varepsilon$-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond, an aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

The secondary battery may be prepared by injecting an electrolyte solution after disposing the separator between the above-described negative electrode and positive electrode, according to a conventional method of preparing a secondary battery.

The secondary battery according to the present invention is suitable for portable devices, such as mobile phones, notebook computers, and digital cameras, and electric cars such as hybrid electric vehicles (HEVs), and, particularly, may be preferably used as a component battery of a medium and large sized battery module. Thus, the present invention also provides a medium and large sized battery module including the above-described secondary battery as a unit cell.

The medium and large sized battery module may be preferably used as a power source for a device requiring high power and large capacity, for example, an electric vehicle, a hybrid electric vehicle, or a power storage device.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES

Example 1: Preparation of Negative Electrode Active Material

Natural graphite (average particle diameter ($D_{50}$): 10 μm) was prepared as an active material core. The active material core was added to an aqueous solution containing 1 wt % of cetyltrimethylammonium bromide (CTAB) as a cationic surfactant and was dispersed by an ultrasonic treatment. In the aqueous solution, cetyltrimethylammonium of the CTAB was coated on the active material core so that an ammonium group having a positive (+) charge faced the outside of the active material core.

Next, phosphoric acid ($H_3PO_4$), as a first precursor, was added into the aqueous solution and dispersed by stirring for 1 hour. Phosphoric acid in the aqueous solution provided phosphate ions ($PO_4^{3-}$), and the phosphate ions and the ammonium group were bonded with each other by electrostatic attraction.

Next, $LiOH \cdot H_2O$ as a second precursor, and $Al(NO_3)_3 \cdot 9H_2O$ and $Ti(OCH(CH_3)_2)_4$, as a third precursor, were added into the aqueous solution. Lithium of the second precursor and aluminum and titanium of the third precursor were distributed around a phosphate group ($PO_4^-$) because they existed in a cationic form or partially had a positive (+) charge.

Next, the first precursor, the second precursor, and the third precursor were subjected to a hydrothermal reaction at 180° C. for 12 hours in the aqueous solution to prepare a lithium compound precursor. Phosphate ions in the first precursor, lithium ions in the second precursor, and aluminum ions and titanium ions in the third precursor formed a precursor of lithium-aluminum-titanium phosphate (Li—Al—Ti—$PO_4$ precursor) by hydrothermal synthesis. The precursor of lithium-aluminum-titanium phosphate was mediated with the active material core by the cationic surfactant to form a composite.

Next, the composite of the precursor of lithium-aluminum-titanium phosphate-cationic surfactant-active material core was taken out from the aqueous solution, washed with distilled water and ethanol, and dried at 80° C. for 12 hours.

Next, the composite was heat-treated at 800° C. for 3 hours in an inert atmosphere. The cationic surfactant was removed by thermal decomposition by the heat treatment, and a protective layer containing lithium-aluminum-titanium phosphate ($Li_{1+x}Al_xTi_{2-x}(PO_4)_3$, x=0.3) was formed on the active material core from the precursor of lithium-aluminum-titanium phosphate. The active material core having the protective layer formed thereon was used as a negative electrode active material of Example 1.

The protective layer was included in an amount of 1 wt % based on a total weight of the negative electrode active material. The amount of the protective layer was measured by thermogravimetric analysis (TGA). Also, amounts of the first precursor, the second precursor, and the third precursor added were adjusted in consideration of a composition of the lithium-aluminum-titanium phosphate ($Li_{1+x}Al_xTi_{2-x}(PO_4)_3$, x=0.3) formed on the active material core.

Example 2: Preparation of Negative Electrode Active Material

A negative electrode active material of Example 2 was prepared in the same manner as in Example 1 except that the amounts of the first precursor, second precursor, and third precursor added were adjusted to two times in Example 1. In the negative electrode active material of Example 2, a protective layer containing lithium-aluminum-titanium phosphate ($Li_{1+x}Al_xTi_{2-x}(PO_4)_3$, x=0.3) was included in an amount of 2 wt % based on a total weight of the negative electrode active material.

Example 3: Preparation of Negative Electrode Active Material

A negative electrode active material of Example 3 was prepared in the same manner as in Example 1 except that the amounts of the first precursor, second precursor, and third precursor added were adjusted to three times in Example 1. In the negative electrode active material of Example 3, a protective layer containing lithium-aluminum-titanium phosphate ($Li_{1+x}Al_xTi_{2-x}(PO_4)_3$, x=0.3) was included in an amount of 3 wt % based on a total weight of the negative electrode active material.

Comparative Example 1: Preparation of Negative Electrode Active Material

The active material core itself (natural graphite) used in Example 1 was used as a negative electrode active material of Comparative Example 1.

Comparative Example 2: Preparation of Negative Electrode Active Material

A negative electrode active material of Comparative Example 2 was prepared in the same manner as in Example 1 except that a cationic surfactant was not used. With respect to Comparative Example 2, since the surfactant was not used, the first precursor, the second precursor, and the third precursor were not coated on the active material core and the first precursor, the second precursor, and the third precursor reacted with each other to form a lithium compound that was present separately from the active material core.

Experimental Examples

<Preparation of Negative Electrode>
The negative electrode active material prepared in Example 1, carbon black as a conductive agent, and a mixture of styrene-butadiene rubber and carboxymethyl cellulose, as a binder, were mixed in a weight ratio of 90:5:5 to prepare a negative electrode slurry.

The negative electrode slurry was coated on one surface of a copper current collector (thickness: 12 μm), the coated negative electrode collector was roll-pressed and dried in a vacuum oven at 100° C. for 12 hours to form a negative electrode active material layer (thickness: 50 μm, loading: 2 mAh/cm$^3$), and thus, a negative electrode of Example 1 was prepared.

Negative electrodes of Example 2, Example 3, Comparative Example 1, and Comparative Example 2 were respectively prepared in the same manner as described above except that the negative electrode active materials of Examples 2 and 3 and Comparative Examples 1 and 2 were respectively used instead of the negative electrode active material of Example 1.

<Preparation of Secondary Battery>

After allowing a lithium metal counter electrode to face the above-prepared negative electrode, a propylene polymer separator was disposed between the negative electrode structure and the lithium metal counter electrode, and an electrolyte was injected to prepare a coin-type half-cell secondary battery.

As the electrolyte, an electrolyte, in which 0.5 wt % of vinylene carbonate (VC) was dissolved and 1 M $LiPF_6$ was dissolved in a solution in which ethyl methyl carbonate (EMC) and ethylene carbonate (EC) were mixed in a volume ratio of 7:3, was used.

Experimental Example 1: Initial Discharge Capacity Evaluation

Charge/discharge reversibility test was performed on the secondary batteries prepared in Examples 1 to 3 and Comparative Examples 1 and 2 using an electrochemical charger/discharger. The secondary batteries were charged by applying a current at a current density of 0.1 C-rate to a voltage of 0.001 V (vs. Li/Li$^+$) during charge and discharged at the same current density to a voltage of 1.5 V during discharge.

After the secondary batteries were charged and discharged to a second cycle under the above charge and discharge conditions, discharge capacity in the second cycle was measured, and the results thereof are presented in Table 1 below.

TABLE 1

|  | Initial discharge capacity (mAh/g) |
| --- | --- |
| Example 1 | 365 |
| Example 2 | 363 |
| Example 3 | 362 |
| Comparative Example 1 | 355 |
| Comparative Example 2 | 357 |

Referring to Table 1, with respect to the secondary batteries of Examples 1 to 3, since the protective layer having excellent ionic conductivity is coated on the active material core to facilitate intercalation of lithium ions, it may be understood that they exhibited better initial capacities than the comparative examples.

However, since the protective layer as in the examples was not present in Comparative Example 1 and, with respect to Comparative Example 2, the protective layer was not formed on the active material core because a surfactant was not used, the intercalation of lithium ions was not easy due to the formation of an SEI layer containing a material having low ionic conductivity such as $Li_2CO_3$, and thus, it may be confirmed that initial discharge capacities were low.

Experimental Example 2: High Rate Capability Evaluation

Charge/discharge reversibility test was performed on the secondary batteries prepared in Examples 1 to 3 and Comparative Examples 1 and 2 using an electrochemical charger/discharger. The secondary batteries were charged by applying a current at a current density of 0.1 C-rate to a voltage of 0.001 V (vs. Li/Li$^+$) during charge and discharged at the same current density to a voltage of 1.5 V during discharge.

Discharge capacities and capacity retentions of the examples and the comparative examples, after the charge and discharge were performed, are presented in Table 2 below.

TABLE 2

|  | Discharge capacity (mAh/g) | Capacity retention (%) |
| --- | --- | --- |
| Example 1 | 242 | 66.3 |
| Example 2 | 245 | 67.5 |
| Example 3 | 235 | 64.9 |
| Comparative Example 1 | 182 | 51.3 |
| Comparative Example 2 | 211 | 59.1 |

Referring to Table 2, it may be confirmed that the secondary batteries of the examples had better high-rate discharge capacities and capacity retentions of the negative electrode than the comparative examples due to the excellent ionic conductivity of the lithium compound-containing protective layer according to the present invention.

With respect to Comparative Example 1, the lithium compound-containing protective layer according to the present invention was not formed on the active material core, and, accordingly, an SEI layer, such as $Li_2CO_3$, was formed on the active material core. It may be understood that low high-rate performance was exhibited due to low ionic conductivity of $Li_2CO_3$.

With respect to Comparative Example 2, it also exhibited lower high-rate performance than the examples. With respect to Comparative Example 2, since a cationic surfactant was not used during the preparation process, a lithium compound was not formed on the surface of the active material core and lithium compound particles separate from the active material core were formed. Thus, with respect to the negative electrode active material of Comparative Example 2, since a component having low ionic conductivity, such as $Li_2CO_3$, formed the SEI layer on the active material core, Comparative Example 2 may not achieve excellent high-rate performance.

Experimental Example 3: Capacity Retention Evaluation

Charge/discharge reversibility test was performed on the secondary batteries prepared in Examples 1 to 3 and Comparative Examples 1 and 2 using an electrochemical charger/discharger. The secondary batteries were charged at 1 C-rate to a state of charge (SOC) of 200% during charge and discharged at the same current density to a voltage of 1.5 V during discharge. The above charge condition is to forcibly cause lithium precipitation by excessive lithium charge.

The number of cycles at which a short circuit occurred by repeating the cycle under the above charge and discharge conditions is presented in Table 3 below.

TABLE 3

|  | The number of cycles at which short circuit occurred |
| --- | --- |
| Example 1 | 71 |
| Example 2 | 86 |
| Example 3 | 61 |
| Comparative Example 1 | 42 |
| Comparative Example 2 | 57 |

Referring to Table 3, with respect to the secondary batteries of the examples, since the lithium compound having excellent ionic conductivity was uniformly coated on the active material core, a degree of precipitation of lithium was small or a concern for the occurrence of precipitation of lithium in the form of dendrites was small, and thus, it may be confirmed that stability, particularly, life characteristics of the negative electrode was improved.

However, with respect to Comparative Example 1, it may be confirmed that the stability of the negative electrode was significantly reduced due to the precipitation of the lithium dendrites according to local overcharge due to the presence of the SEI layer on the active material core.

With respect to Comparative Example 2, it also exhibited lower high-rate performance than the examples. With respect to Comparative Example 2, since a cationic surfactant was not used during the preparation process, a lithium compound was not formed on the surface of the active material core, and the lithium compound particles separate from the active material core were formed. Accordingly, since the component having low ionic conductivity, such as $Li_2CO_3$, formed the SEI layer on the active material core, life stability of the negative electrode may not be exhibited in Comparative Example 2.

The invention claimed is:

1. A method of preparing a negative electrode active material, the method comprising:

(a) dispersing an active material core in a solution comprising a surfactant to coat the surfactant on the active material core;

(b) adding and dispersing a first precursor, which bonds with the surfactant by electrostatic attraction, in the solution resulting from (a);

(c) adding and dispersing a second precursor, which bonds with the first precursor by electrostatic attraction, in the solution resulting from (b);

(d) preparing a lithium compound precursor by a hydrothermal reaction of the first precursor and the second precursor in the solution resulting from (c); and (e) performing a heat treatment on the lithium compound precursor resulting from (d) to thermally decompose the surfactant, and forming a protective layer comprising a lithium compound on the active material core, with the proviso that when the surfactant is a cationic surfactant, the first precursor is a compound comprising at least one selected from the group consisting of hydrogen sulfide ($H_2S$), nitric acid ($HNO_3$), hydrofluoric acid (HF), silicic acid ($H_4SiO_4$), sulfuric acid ($H_2SO_4$), and phosphoric acid ($H_3PO_4$), and the second precursor is at least one selected from the group consisting of lithium hydroxide, lithium oxide, lithium nitrate, and lithium sulfate; and with the proviso that when the surfactant is an anionic surfactant, the first precursor is at least one selected from the group consisting of lithium hydroxide, lithium oxide, lithium nitrate, and lithium sulfate, and the second precursor is a compound comprising at least one selected from the group consisting of hydrogen sulfide ($H_2S$), nitric acid ($HNO_3$), hydrofluoric acid (HF), silicic acid ($H_4SiO_4$), sulfuric acid ($H_2SO_4$), and phosphoric acid ($H_3PO_4$).

2. The method of claim 1, wherein the surfactant is a cationic surfactant, the first precursor is a compound comprising at least one selected from the group consisting of hydrogen sulfide ($H_2S$), nitric acid ($HNO_3$), hydrofluoric acid (HF), silicic acid ($H_4SiO_4$), sulfuric acid ($H_2SO_4$), and phosphoric acid ($H_3PO_4$), and the second precursor is at least one selected from the group consisting of lithium hydroxide, lithium oxide, lithium nitrate, and lithium sulfate.

3. The method of claim 2, wherein the cationic surfactant comprises at least one selected from the group consisting of cetyltrimethylammonium bromide, triethylemine hydrochloride, benzothonium chloride, and cetylpyridinium chloride.

4. The method of claim 2, wherein, in (c), a third precursor, which comprises at least one metal selected from the group consisting of lanthanum (La), zirconium (Zr), titanium (Ti), aluminum (Al), and germanium (Ge), is added and dispersed in the solution together with the second precursor.

5. The method of claim 1, wherein the surfactant is an anionic surfactant, the first precursor is at least one selected from the group consisting of lithium hydroxide, lithium oxide, lithium nitrate, and lithium sulfate, and the second precursor is a compound comprising at least one selected from the group consisting of hydrogen sulfide ($H_2S$), nitric acid ($HNO_3$), hydrofluoric acid (HF), silicic acid ($H_4SiO_4$), sulfuric acid ($H_2SO_4$), and phosphoric acid ($H_3PO_4$).

6. The method of claim 5, wherein the anionic surfactant comprises at least one selected from the group consisting of ammonium lauryl sulfate, sodium lauryl sulfate, sodium laureth sulfate, α-olefin sulfonate, and sodium stearate.

7. The method of claim 5, wherein, in (b), a third precursor, which comprises a metal selected from the group consisting of lanthanum (La), zirconium (Zr), titanium (Ti), aluminum (Al), and germanium (Ge), is added and dispersed in the solution together with the first precursor.

8. The method of claim 1, wherein the hydrothermal reaction is performed in a temperature range of 100° C. to 300° C.

9. The method of claim 1, wherein the heat treatment is performed in a temperature range of 600° C. to 1,000° C.

10. The method of claim 1, wherein the lithium compound is at least one lithium compound selected from the group consisting of a sulfide, a fluoride, a silicate, a nitrate, and a phosphate.

11. The method of claim 1, wherein the lithium compound is at least one selected from the group consisting of lithium-lanthanum-titanium oxide, lithium-lanthanum-zirconium oxide, lithium-aluminum-titanium phosphate, lithium-aluminum-germanium phosphate, lithium-phosphorous nitride, lithium fluoride, and lithium-phosphorus sulfide.

12. The method of claim 1, wherein the protective layer is formed in an amount of 0.5 wt % to 5 wt % based on a total weight of the active material core and the protective layer.

13. The method of claim 1, wherein the active material core comprises at least one selected from the group consisting of a carbon-based material and a silicon-based material.

14. The method of claim 1, wherein an average particle diameter ($D_{50}$) of the active material core is in a range of 1 μm to 30 μm.

15. The method of claim 1, wherein the lithium compound is a compound represented by Formula 1:

$$Li_{1+x}Al_xM_{2-x}(PO_4)_3 \qquad \text{[Formula 1]}$$

wherein, in Formula 1, M is Ti or Ge, and 0<x<1.

* * * * *